United States Patent [19]

Collins et al.

[11] Patent Number: 5,156,913
[45] Date of Patent: Oct. 20, 1992

[54] GLASS REINFORCED ACETAL POLYMER PRODUCTS

[75] Inventors: George L. Collins, Maplewood; Edwina Ying, Bridgewater, both of N.J.

[73] Assignee: Hoechst Celanese Corp., Somerville, N.J.

[21] Appl. No.: 448,401

[22] Filed: Dec. 11, 1989

[51] Int. Cl.⁵ .................. B32B 9/00; D02C 1/00; C08K 3/40; C08L 63/00

[52] U.S. Cl. .................. 428/392; 428/359; 428/361; 428/375; 523/208; 523/202; 523/444

[58] Field of Search ............. 523/208, 202, 466, 444; 428/426, 437, 436, 392

[56] References Cited

U.S. PATENT DOCUMENTS

| | | | |
|---|---|---|---|
| 3,337,507 | 8/1967 | Gutweiler et al. | 260/67 |
| 3,639,192 | 2/1972 | Burg et al. | 156/327 |
| 3,963,668 | 6/1976 | Wurmb et al. | 524/593 |
| 4,230,606 | 10/1980 | Amann et al. | 524/542 |
| 4,427,807 | 1/1984 | Zimmerman et al. | 523/466 |
| 4,456,710 | 6/1984 | Lüders et al. | 523/208 |
| 4,480,071 | 10/1984 | Natarajan et al. | 524/593 |
| 4,578,422 | 3/1986 | Sakurai et al. | 524/100 |
| 4,613,634 | 9/1986 | McKie | 523/223 |
| 4,652,594 | 3/1987 | Auerbach et al. | 523/208 |
| 4,689,373 | 8/1987 | Auerbach et al. | 525/398 |
| 4,758,608 | 7/1988 | Collins et al. | 525/401 |
| 4,786,659 | 11/1988 | McKie et al. | 523/444 |
| 4,788,258 | 11/1988 | Collins et al. | 525/414 |
| 4,801,626 | 1/1989 | Auerbach et al. | 523/208 |
| 4,898,925 | 2/1990 | Collins et al. | 523/208 |
| 4,954,400 | 9/1990 | Collins et al. | 428/414 |

FOREIGN PATENT DOCUMENTS 42-22065 10/1967 Japan.

*Primary Examiner*—Patrick J. Ryan
*Assistant Examiner*—Jill M. Gray
*Attorney, Agent, or Firm*—Michael W. Ferrell

[57] ABSTRACT

There are provided novel mixtures and composites comprising a normally crystalline acetal polymer and a reinforcing material comprising glass fibers or filaments sized with a normally non-crystalline elastomeric copolymer of about 15 to 45 mol %, preferably about 25 to 35 mol % of trioxane, about 55 to 85 mol %, preferably about 65 to 75 mol % of 1,3-dioxolane, said mol percents based on the total of trioxane and 1,3-dioxolane, and about 0.005 to 0.15 wt. %, preferably about 0.05 to 0.12 wt. % of 1,4-butanediol diglycidyl ether or butadiene diepoxide as a bifunctional monomer, based on the total weight of copolymer.

18 Claims, No Drawings

GLASS REINFORCED ACETAL POLYMER PRODUCTS

BACKGROUND OF THE INVENTION

1. Field of the Invention

This invention relates to glass fiber reinforced acetal polymer mixtures and composites having excellent mechanical properties, e.g., tensile and flexural strength. These compositions are intended for the production of articles requiring particularly high levels of such properties, e.g. spin gears for washing machines and windshield wiper pivots.

2. Description of Related Art

The following information is disclosed in accordance with the terms of 37 CFR 1.56, 1.97 and 1.98.

Crystalline acetal polymers reinforced with glass fibers are commercially produced and sold by the assignee, Hoechst Celanese Corporation.

U.S. Pat. No. 3,639,192, issued Feb. 1, 1972 to Burg et al., discloses for use as adhesives copolymers of formaldehyde or trioxane with 1 to 60% by weight, preferably 1 to 30% by weight, of a cyclic ether, cyclic and/or linear acetal, e.g., 1,3-dioxolane, and/or an alkyl glycidyl formal, polyglycol diglycidyl ether, or bis (alkane triol) triformal. Example 5 discloses a terpolymer of 97.95 wt.% of trioxane, 2 wt.% of ethylene oxide, and 0.05 wt.% of 1,4-butanediol diglycidyl ether (BDGE).

U.S. Pat. No. 3,337,507, issued Aug. 22, 1967 to Gutweiler et al., teaches the formation of high molecular weight copolymers obtained by polymerizing a mixture of trioxane and any of certain polyformals. Example 4 of the patent shows the use of a polyformal which is a clear highly viscous oil at 70° C. obtained by polymerizing a mixture of ⅓ mole of trioxane and 1 mole of dioxolane in the presence of p-nitrophenyl-diazonium fluoroborate as catalyst.

U.S. Pat. No. 4,788,258, issued Nov. 29, 1988 to Collins et al., discloses and claims low Tg acetal copolymers of trioxane and 65 to 75 mol % of 1,3-dioxolane, which are non-crystalline at room temperature and are useful as blending and adhesive agents for conventional, normally crystalline acetal polymers. Also disclosed are blends of the foregoing polymers containing glass in the form of filaments or strands which can be sized or otherwise combined with coupling agents.

U.S. Pat. No. 4,652,594, issued Mar. 24, 1987 to Auerbach et al., discloses glass fiber reinforced oxymethylene polymer molding compositions in which the glass fibers and oxymethylene polymer are coupled with an amino resin.

Japanese Kokai Sho 42-22,065 of Yamaguchi et al., published Oct. 30, 1967, discloses copolymers of trioxane and an aperiodic ring compound, e.g., 1,3-dioxolane, prepared in liquid sulfur dioxide, and in Example 1 shows a copolymer of trioxane and 64 mol % of 1,3-dioxolane.

Pending application Ser. No. 243,381, filed Sep. 12, 1988 by Collins et al., now U.S. Pat. No. 4,898,925, discloses and claims elastomeric copolymers of 15 to 45 mol % of trioxane, 55 to 85 mol % of dioxolane and a small amount of BDGE or butadiene diepoxide, which are non-crystalline at room temperature, and states that such copolymers are useful as adhesive agents for conventional crystalline acetal polymers and other materials, e.g. glass. The entire disclosure of this application is incorporated by reference.

Pending application Ser. No. 255,569 filed Oct. 11, 1988 by Collins et al., now U.S. Pat. No. 4,954,400, discloses and claims bonded articles, e.g., of conventional crystalline acetal polymers and other materials such as glass, wherein the bonding agents are elastomeric, normally non-crystalline terpolymers of the type disclosed in previously cited application Ser. No. 243,381, now U.S. Pat. No. 4,898,925.

SUMMARY OF THE INVENTION

In accordance with this invention there are provided novel mixtures and composites comprising a normally crystalline moldable acetal polymer and a reinforcing material comprising glass fibers or filaments, preferably sized with an elastomeric copolymer of about 15 to 45 mol %, preferably about 25 to 35 mol % of trioxane, about 55 to 85 mol %, preferably about 65 to 75 mol % of 1,3-dioxolane, and about 0.005 to 0.15 wt.%, preferably about 0.05 to 0.12 wt.%, of 1,4-butanediol diglycidyl ether or butadiene diepoxide as a bifunctional monomer, based on the total weight of copolymer. In addition to being elastomeric, the latter copolymers are substantially non-crystalline at room temperature (25° C.).

Because the elastomeric copolymers in the sizing of the glass reinforcing material has interaction with a normally crystalline acetal polymer matrix, there is less tendency for the glass filaments or fibers to separate from the matrix when an article composed of the glass reinforced mixture or composite is subjected to stress. This translates into better mechanical properties, particularly higher levels of tensile and flexural strength, as compared with similar compositions in which the glass filaments or fibers do not contain any sizing composition.

DESCRIPTION OF PREFERRED EMBODIMENTS

The Crystalline Acetal Polymers

The moldable, crystalline acetal polymers whose performance is capable of being improved by incorporating a reinforcing material comprising glass filaments or fibers sized with any of the contemplated elastomeric copolymers include any oxymethylene polymer having oxymethylene groups which comprise at least about 85 percent of the polymer's recurring units, i.e., homopolymers, copolymers, terpolymers and the like.

Typically, crystalline oxymethylene homopolymers, also called polyformaldehydes or poly(oxymethylenes), are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Crystalline oxymethylene copolymers which are especially suitable for utilization with the glass reinforcing material of this invention will usually possess a relatively high level of polymer crystallinity, i.e., about 60 to 80 percent or higher. These preferred oxymethylene copolymers have repeating units which consist essentially of oxymethylene groups interspersed with oxy(higher)alkylene groups represented by the general formula:

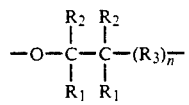

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such crystalline copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Crystalline copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred crystalline oxymethylene copolymers are those represented by the general formula:

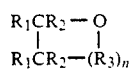

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred crystalline oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3 -butylene oxide, 1,4-butanediol formal, and the like.

Crystalline oxymethylene copolymers produced from the preferred cyclic ethers have a structure composed substantially of oxymethylene and oxy(lower)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at about 25° C. in a 0.2 wt.% solution in HFIP).

These crystalline oxymethylene copolymers preferably are stabilized to a substantial degree prior to being utilized with the glass reinforcing material of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The crystalline oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of crystalline oxymethylene copolymers is commercially available from Hoechst Celanese Corporation under the designation CELCON acetal copolymer, and especially preferred are copolymers of trioxane with 1.7-2.0 wt.% of ethylene oxide marketed as CELCON M25, M90 and M270 acetal copolymers, which have melt indexes of about 2.5, 9.0 and 27.0 g/10 min. respectively when tested in accordance with ASTM D1238-82.

Crystalline oxymethylene terpolymers having oxymethylene groups, oxy(higher)alkylene groups such as those corresponding to the above-recited general formula:

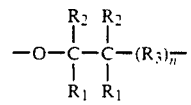

and a different, third group interpolymerizable with oxymethylene and oxy(higher)alkylene groups may be prepared, for example, by reacting trioxane, a cyclic ether or cyclic acetal and, as the third monomer, a bifunctional compound such as diglycide of the formula:

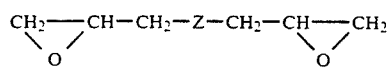

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy)group, preferably one having from 2 to 4 recurring lower alkoxy groups each with 1 or 2 carbon atoms, for example, ethylene diglycide, diglycidyl ether and diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclotutane-1,3-diol, with butanediol diglycidyl ethers being most preferred.

Generally, when preparing such crystalline terpolymers, ratios of from 99.89 to 89.0 wt.% trioxane, 0.1 to 10 wt.% of the cyclic ether or cyclic acetal and 0.01 to 1 wt.% of the bifunctional compound are preferred, these percentages being based on the total weight of monomers used in forming the terpolymer. Ratios of from 99.85 to 89.5 wt.% of trioxane, 0.1 to 10 wt.% of cyclic ether or cyclic acetal and 0.05 to 0.5 wt.% of diglycidyl ether are particularly preferred, these percentages again being based on the total weight of monomers used in forming the terpolymer.

Terpolymer polymerization in preparing the contemplated crystalline terpolymers may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about 65° C. to about 100° C.

Cationic polymerization catalysts, such as organic or inorganic acids, acid halides and, preferably, Lewis acids, can be used in preparing the crystalline terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the crystalline terpolymer. Thus, catalyst concentration may range from about 0.0001 to about 1 wt.%, and preferably will range from about 0.001 to about 0.1 wt.%, based on the total weight of the monomer mixture.

Since catalysts tend to decompose the crystalline terpolymer, the catalyst is advantageously neutralized immediately after polymerization using, for example, ammonia or methanolic or acetonic amine solutions.

Unstable terminal hemiacetal groups may be removed from the crystalline terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 wt.% methanol and 40 wt.% water containing ammonia or an aliphatic amine.

The crystalline terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the crystalline terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° C. for a specified period of time, and then washed with water and dried or centrifuged.

A preferred crystalline oxymethylene terpolymer is commercially available from Hoechst Celanese Corporation under the designation CELCON U10 acetal polymer, and is a butanediol diglycidyl ether/ethylene oxide/trioxane terpolymer containing about 0.05 wt.%, 2.0 wt.%, and 97.95 wt.% of repeating units derived from these termonomers, respectively, based on the total weight of these termonomers.

Additives such as plasticizers, formaldehyde scavengers, mold lubricants, antioxidants, fillers, colorants, reinforcing agents, light stabilizers and other stabilizers, pigments, and compatible polymers and prepolymers, e.g., the superpolymamides disclosed in U.S. Pat. No. 2,993,024, the prepolymeric amino resins disclosed in U.S. Pat. No. 4,652,594, and the thermoplastic polyurethanes and multiphase composite interpolymers disclosed in U.S. Pat. No. 4,665,126, can be used with the crystalline oxymethylene polymer of this invention so long as such additives do not materially affect the desired interaction between the crystalline oxymethylene polymer and the elastomeric copolymer for the improvement of adhesiveness. Such additives can be admixed with the crystalline oxymethylene polymer using conventional mixing techniques.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, long-chain amides, waxes, oils, and polyether glycides. A preferred mold lubricant is N,N-ethylenebisstearamide commercially available from Glycol Chemical, Inc. under the trademark "Acrawax C". The preferred antioxidants are hindered bisphenols. Especially preferred is 1,6-hexamethylene bis-(3',5'-di-t-butyl-4'-hydroxyhydrocinnamate), commercially available from Ciba-Geigy Corp. under the trademark "Irganox 259".

Suitable compounded crystalline oxymethylene two component copolymers for use in the compositions of this invention are commercially available from Hoechst Celanese Corporation under the designations CELCON M25-04, M90-04 and M270-04 acetal polymers. These are the previously mentioned CELCON M25, M90 and M270 acetal copolymers respectively, each stabilized by 0.5 percent by weight Irganox 259, 0.1 percent by weight cyanoguanidine, and 0.2 percent by weight Acrawax C.

A suitable compounded crystalline oxymethylene terpolymer for use in the compositions of this invention is commercially available from Hoechst Celanese Corporation under the designation CELCON U10-11 acetal polymer. This is the previously mentioned CELCON U-10 acetal terpolymer stabilized by 0.5 percent by weight Irganox 259 and 0.1 percent by weight calcium ricinoleate.

Preferably, the normally crystalline acetal polymer is dried before being combined with the glass reinforcing material. Drying can be done in desiccated air having a dew point of about −30° C. to −40° C. or lower, at a temperature of about 70° C. to about 110° C. The drying time will depend primarily on the moisture content, drying temperature and particular equipment employed, but typically will be from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 wt.%, based on the weight of the crystalline oxymethylene polymer, preferably below about 0.05 wt.%, and most preferably below about 0.01 wt.%.

The Glass Reinforcing Material

The glass reinforcing material may comprise relatively long length filaments or short length fibers, e.g, in the form of rovings, chopped and milled fibers or cloths and mats. As used in this disclosure, the terms "glass fibers" and "glass filaments" denote the glass reinforcing material in any of the foregoing forms. Preferably, the reinforcing material is in the form of fibers e.g., with a length in the range of about 0.125 inch to continuous rovings, and a diameter in the range of about 6 to 13 microns, which are intimately mixed with the crystalline acetal polymer.

The Elastomeric Copolymer

The monomers used in the preparation of the elastomeric copolymers present in the sizing compositions applied to the glass reinforcing material utilized in this invention are preferably fairly dry, i.e., contain no more than about 10 ppm of water. The monomers are dried using techniques well known in the art, e.g., azeotropic distillation with benzene or by distilling the monomer in contact with sodium or potassium metal onto activated molecular sieves and keeping the monomer in contact with circulating nitrogen which itself is dried by contact with $P_2O_5$.

The elastomeric copolymers may be formed by a process of bulk polymerization wherein appropriate amounts of dry 1,3-dioxolane and 1,4-butanediol diglycidyl ether (BDGE) or butadiene diepoxide are added to dry molten trioxane to form a polymerizable mixture which in most cases remains liquid at room temperature. The polymerization reaction is carried out under an inert atmosphere, e.g., one obtained using dry nitrogen, argon, or the like, or a mixture of inert gases, in the presence of a catalytically effective amount of a cationic polymerization catalyst, such as p-nitrobenzenediazonium tetrafluoroborate (PNDB), trifluoromethane sulfonic acid, boron trifluoride, a boron trifluoride etherate such as boron trifluoride dibutyletherate, or the like, e.g., an amount ranging, for example, from about $1 \times 10^{-4}$ M/1 to about $5 \times 10^{-3}$ M/12, preferably from about $1 \times 10^{-3}$ M/1 to about $1.5 \times 10^{-3}$ M/1, based on the volume of the reaction medium, i.e., reactants plus any solvents, suspending agents or other additives employed.

If PNDB is used as the catalyst, it is often convenient to add it as a solution, e.g., of about 5 to 10 wt.%, in nitromethane.

The polymerization reaction for the preparation of the elastomeric copolymers is carried out, for example, at a temperature of from about 15° to about 30° C., and preferably at from about 20° to about 25° C., at pressures ranging from about 750 to about 770 psi, for about 15 to about 30 hours, preferably about 20 to about 25 hours.

These polymers can also be prepared under the foregoing conditions by polymerizing the monomers in a solvent, solvent mixture or suspending agent for the monomers, e.g., a halogenated hydrocarbon such as methylene chloride, a hydrocarbon such as hexane, cyclohexane, nonane or dodecane, or the like, or a mixture of two or more of these or other suitable solvents or suspending agents.

In addition to the prescribed monomers, the monomer mixture used to prepare the elastomeric copolymers may contain minor amounts of related monomers, e.g., up to about 5 mol % of other cyclic formals, e.g., ethylene oxide or 1,4-butanediol formal, and up to about 1 wt.% of other bifunctional monomers, e.g., diglycidyl ethers of ethylene glycol and higher alkanediols other than 1,4-butanediol.

The elastomeric copolymers will in most cases have an inherent viscosity of about 0.7 to 2.75, measured at 25° C. in a 0.2 wt.% solution in hexafluoroisopropanol (HFIP). In addition, the elastomeric copolymers are in most cases substantially non-crystalline in the unstretched state at room temperature (25° C.), as indicated by differential scanning calorimetry (DSC) data.

The elastomeric copolymers have enhanced elastomeric properties over a wide temperature range. For example, in most cases they can be formed into a ball that will hold its shape and will not collapse under its own weight after an extended period. Furthermore, the copolymers can usually be stretched in the fashion of a rubber band and substantially recover their previous length when released. When the elastomeric copolymers of the invention are subjected to a standard oscillatory flow test at an elevated temperature, e.g., 190° C., they are shown to largely retain their properties of elasticity and viscosity.

The sizing composition applied to the glass reinforcing material may suitably be a solution of, for example, about 15 to 25 wt.% of the elastomeric copolymer in a suitable solvent, e.g., water or one of the organic solvents mentioned previously as suitable polymerization solvents for such copolymer, e.g., a halogenated hydrocarbon such as methylene chloride. When the glass reinforcing material is in the form of short length fibers, the foregoing solution may be agitated with, for example, about 10 to 30 wt.% of the glass fibers for a period of, for example, about 0.5 to 2 hours. The glass fibers are then allowed to drain, e.g., on a wire gauze screen and dried, e.g., in a vacuum oven, to obtain the contemplated sized glass fibers. Other forms of the glass reinforcing material may be similarly sized with the elastomeric copolymer solution using equivalent procedures as are well known in the art.

As stated, a preferred embodiment of the product of this invention resides in a crystalline acetal polymer intimately mixed with short length fibers of glass reinforcing material sized with the elastomeric copolymer of the invention. Such a composition may be prepared by any conventional procedure that will result in a substantially uniform mixture of the components. Preferably, dry or melt mixing procedures and equipment are used. The sized glass fibers may be initially dry mixed with the crystalline acetal polymer (in the form of pellets, chips, flakes, granules or powder), typically at room temperature (about 25° C.), and the resulting mixture further mixed above the melting point of the crystalline polymer in any conventional type mixing equipment, which is customarily heated to a temperature of from about 170° C. to about 220° C., and preferably from about 190° C. to about 218° C. The sequence of addition of the components is not critical, and any conventional means may be used to form the polymer/glass fiber mixture. Conventional additives for the crystalline acetal polymer as described previously may be added at this time if not previously added.

The glass reinforced polymer mixture resulting from the foregoing procedure may then be comminuted mechanically, for example by chopping, pelletizing or grinding, into granules, pellets, chips, flakes or powders, and processed in the thermoplastic state, for example by injection molding or extrusion molding into shaped articles, including bars, rods, plates, sheets, films, ribbons, tubes and the like. Preferably, the comminuted blend is dried again, in the manner discussed above prior to being molded.

The mixtures and composites of this invention generally contain at least about 50 weight percent, preferably about 50 to 95 weight percent, more preferably about 60 to 90 weight percent, and most preferably about 70 to 80 weight percent of the normally crystalline acetal polymer, and about 5 to 50 weight percent, preferably about 10 to 40 weight percent and most preferably about 20 to 30 weight percent of the glass reinforcing material.

The following examples further illustrate the invention.

EXAMPLE 1

A non-crystalline elastomeric acetal terpolymer was prepared by transferring 300 ml of dry, freshly distilled, molten trioxane under a nitrogen atmosphere to a half gallon reactor fitted with a magnetic stirrer which was previously purged with nitrogen. There were then added to the reactor under a nitrogen atmosphere 700 ml of dry 1,3-dioxolane and 1 ml. of dry 1,4-butanediol diglycidyl ether (BDGE). The mixture was allowed to fall to room temperature (25° C.). The catalyst for the reaction was p-nitrobenzenediazonium tetrafluoroborate (PNDB) which was initially added as 3 ml of a dry solution of 346 mg in a 10 ml of nitromethane ($0.45 \times 10^{-3}$ M/l of catalyst). Before reaction started, 1 ml of the reaction mass was tested in a moisture meter and found to contain no water. Subsequently, an additional amount of PNDB as 2 ml of a solution of 1186 mg of the catalyst in 10 ml of nitromethane ($1 \times 10^{-3}$ M/l of catalyst) was added to the reactor.

After about 24 hours of polymerization, 700 ml of methylene chloride plus enough tributylamine to neutralize the catalyst were added and the reaction shaken for about 24 hours, after which some of the polymer remained undissolved. The solution was then removed from the reactor, and added to 1000 ml of cold ethanol and stirred with a mechanical shaft stirrer for 1-2 hours. The resulting two-phase mixture was placed in an ice bath and allowed to stand for two hours after which time solid polymer settled. The ethanol was decanted and the polymer dried in a vacuum oven. The elastomeric terpolymer contained about 32.0 mol % of polymerized trioxane, and about 68.0 mol % of polymerized 1,3-dioxolane, based on the total of trioxane and dioxolane, and also contained about 0.1 wt.% of BDGE based on the weight of the copolymer. It had an inherent viscosity (IV) of about 2.0 and is characterized as the "first cut".

The work-up procedure described in the previous paragraph was repeated with the undissolved polymer remaining in the polymerization reaction. This polymer had an IV of about 2.4 and is characterized as the "second cut".

The foregoing first cut of polymer in an amount of about 214 grams was dissolved in 750 ml of water to yield a solution of about 20 weight percent of elastomeric copolymer. Glass fibers in an amount of about 130 grams and having a length of 0.25 in. and a diameter of 13 microns, were tumbled in an excess of the polymer solution for about 24 hours following which aggregated balls resulting from the tumbling were removed. The remaining glass fibers were drained on a wire gauze screen. They were then treated in a vacuum oven to remove excess solvent and obtain the final sized fibers.

A stabilized, normally crystalline acetal copolymer of trioxane and about 1.7-2.0 wt.% of the ethylene oxide previously identified as being available from Hoechst Celanese Corporation under the designation "CELCON M90-04,", was compounded with the foregoing sized glass fibers in an amount of 25 wt.% based on the total mixture, by mixing in a Buss Kneader at about 200° C. at a rate of about 30 lbs/hour. The resulting glass reinforced acetal polymer mixture had the following mechanical properties: tensile strength 16.0 ksi; tensile modulus 1.3 msi; elongation 2.3%; flexural strength 23.4 ksi; and flexural modulus 1.1 msi.

EXAMPLE 2

The procedure of Example 1 was followed except that the second cut of elastomeric copolymer described in the

- 16 - . previous example was used as the sizing copolymer. The resulting glass reinforced acetal polymer mixture had the following properties: tensile strength 16.3 ksi; tensile modulus 1 2 msi; elongation 2.4%; flexural strength 22.9 ksi; and flexural modulus 1.1 msi.

The mechanical properties obtained with the glass reinforced mixtures of the examples are superior to those obtained with similar mixtures in which the glass fibers are not sized.

Glass reinforced acetal polymer mixtures similar in properties to those of the foregoing examples can be obtained by using an elastomeric sizing copolymer prepared by substituting butadiene diepoxide for the 1,4-butanediol diglycidyl ether in approximately the same amount by weight. Moreover, satisfactory mixtures under the invention may be made by substituting any of the specific elastomeric copolymers disclosed in previously cited application Ser. No. 243,381 for the elastomeric sizing copolymer utilized in the foregoing examples.

We claim:

1. Mixtures and composites comprising a normally crystalline acetal polymer and a reinforcing material comprising glass fibers or filaments sized with a normally non-crystalline elastomeric copolymer of about 15 to 45 mol % of trioxane, about 55 to 85 mol % of 1,3-dioxolane based on the total of trioxane and 1,3-dioxolane, and about 0.005 to 0.15 wt.% of 1,4-butanediol diglycidyl ether or butadiene diepoxide as a bifunctional monomer, based on the total weight of the copolymer, said normally noncrystalline elastomeric copolymer having an inherent viscosity of about 0.7 to about 2.75 when measured at about 25° C. as a 0.2 wt. % solution in hexafluoroisopropanol.

2. The mixtures and composites of claim 1 wherein said elastomeric copolymer contains about 25 to 35 mol % of polymerized trioxane and about 65 to 75 mol % of polymerized 1,3-dioxolane base on the total of trioxane and 1,3-dioxolane, and about 0.05 to 0.12 wt.% of polymerized 1,4-butanediol diglycidyl ether or butadiene diepoxide as a bifunctional monomer, based on the total weight of copolymer.

3. The mixtures and composites of claim 1 wherein said elastomeric copolymer contains polymerized 1,4-butanediol diglycidyl ether as bifunctional monomer.

4. The mixtures and composites of claim 1 wherein said elastomeric copolymer contains polymerized butadiene diepoxide as bifunctional monomer.

5. The mixtures and composites of claim 1 wherein said crystalline acetal polymer contains at least 85% of recurring oxymethylene units in the polymer chain.

6. The mixtures and composites of claim 5 wherein said crystalline acetal polymer is an oxymethylene homopolymer.

7. The mixtures and composites of claim 5 wherein said crystalline acetal polymer contains 85 to 99.9% of recurring oxymethylene units and 0.1 to 15% of recurring oxy(higher)alkylene units produced by the opening of a ring of a cyclic ether or cyclic formal during copolymerization.

8. The mixtures and composites of claim 7 wherein said oxymethylene units are produced from trioxane and said oxy(higher)alkylene units are oxyethylene units produced from ethylene oxide during copolymerization.

9. The mixtures and composites of claim 1 wherein said reinforcing material consists of short length glass fibers.

10. The mixtures and composites of claim 10 wherein said glass fibers have a length in the range of about 0.125 inches.

11. The mixtures and composites of claim 9 containing about 60 to 90 weight percent of said crystalline acetal polymer and about 10 to 40 weight percent of said glass fibers.

12. A reinforcing material comprising glass fibers or filaments sized with a normally non-crystalline elastomeric copolymer of about 15 to 45 mol % of trioxane, about 55 to 85 mol % of 1,3-dioxolane based on the total of trioxane and 1,3-dioxolane, and about 0.005 to 0.5 wt.% of 1,4-butanediol diglycidyl ether or butadiene diepoxide as a bifunctional monomer, based on the total weight of copolymer.

13. The reinforcing material of claim 12 wherein said elastomeric copolymer contains about 25 to 35 mol % of polymerized trioxane and about 65 to 75 mol % of polymerized 1,3-dioxolane based on the total trioxane and 1,3-dioxolane, and about 0.05 to 0.12 wt.% of polymerized 1,4-butanediol diglycidyl ether or butadiene diepoxide as a bifunctional monomer, based on the total weight of copolymer.

14. The reinforcing material of claim 12 wherein said elastomeric copolymer contains polymerized 1,4-butanediol diglycidyl ether as bifunctional monomer.

15. The reinforcing material of claim 12 wherein said elastomeric copolymer contains polymerized butadiene diepoxide as bifunctional monomer.

16. The reinforcing material of claim 12 wherein said elastomeric copolymer has an inherent viscosity of about 0.7 to 2.75 measured at about 25° C. in a 0.2 wt.% solution in hexafluroisopropanol.

17. The reinforcing material of claim 12 in the form of short length fibers.

18. The reinforcing material of claim 17 wherein said glass fibers have a length in the range of about 0.125 inches.

* * * * *